United States Patent
Kuppuswamy et al.

(10) Patent No.: US 11,472,039 B1
(45) Date of Patent: Oct. 18, 2022

(54) DEFORMABLE SENSOR WITH ROTATABLE SENSING COMPONENTS FOR DETECTING DEFORMATION LEVELS

(71) Applicant: TOYOTA RESEARCH INSTITUTE, INC., Los Altos, CA (US)

(72) Inventors: Naveen Suresh Kuppuswamy, Arlington, MA (US); Alexander Alspach, Somerville, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 5 days.

(21) Appl. No.: 17/238,589

(22) Filed: Apr. 23, 2021

(51) Int. Cl.
  *B25J 13/08* (2006.01)
  *B25J 19/02* (2006.01)
  *G01L 1/24* (2006.01)

(52) U.S. Cl.
  CPC ........... *B25J 13/082* (2013.01); *B25J 19/021* (2013.01); *G01L 1/24* (2013.01); *B25J 13/084* (2013.01)

(58) Field of Classification Search
  CPC ...... B25J 13/082; B25J 13/084; B25J 19/021; G01L 1/24
  USPC .......................................................... 73/763
  See application file for complete search history.

(56) References Cited

U.S. PATENT DOCUMENTS

| | | | |
|---|---|---|---|
| 6,220,099 B1 * | 4/2001 | Marti | G01N 27/902 73/633 |
| 7,420,155 B2 * | 9/2008 | Mizota | G01L 5/228 250/221 |
| 8,411,140 B2 * | 4/2013 | Adelson | G06F 3/042 348/135 |
| 9,513,178 B2 * | 12/2016 | Tar | G01L 1/248 |
| 9,802,316 B2 * | 10/2017 | Koselka | G01L 5/009 |
| 9,816,800 B2 | 11/2017 | O'Brien | |
| 10,549,428 B2 | 2/2020 | Alspach et al. | |
| 10,574,944 B2 * | 2/2020 | Adelson | H04N 7/183 |
| 2003/0137580 A1 * | 7/2003 | Sumi | H04N 1/00034 347/243 |
| 2008/0027582 A1 * | 1/2008 | Obinata | B25J 13/084 73/9 |
| 2008/0245955 A1 * | 10/2008 | Tachi | G01L 5/166 250/221 |
| 2020/0001540 A1 | 1/2020 | Mcalpine et al. | |
| 2020/0246980 A1 | 8/2020 | Kuppuswamy et al. | |
| 2021/0129971 A1 * | 5/2021 | Brown, Jr. | G01N 21/958 |

FOREIGN PATENT DOCUMENTS

WO  2020068129 A1  4/2020

\* cited by examiner

*Primary Examiner* — Nathaniel T Woodward
(74) *Attorney, Agent, or Firm* — Dinsmore & Shohl LLP (57) ABSTRACT

A deformable sensor is provided. The deformable sensor comprises a deformable member defining an enclosure that is configured to be filled with a medium, a mechanical component disposed within the enclosure, and an optical sensor coupled to the mechanical component positioned with the enclosure. In embodiments, the mechanical component is configured to rotate at least from a first position to a second position, and the optical sensor is configured to capture first portion data associated with a first portion of the deformable member at the first position and second portion data associated with a second portion of the deformable member at the second position.

20 Claims, 11 Drawing Sheets

DEFORMABLE SENSOR WITH ROTATABLE SENSING COMPONENTS FOR DETECTING DEFORMATION LEVELS

TECHNICAL FIELD

The present specification relates to a deformable sensor that may be positioned on robots, and more specifically, to a deformable sensor including sensing components that have rotating capabilities, which enable these components to effectively detect deformation levels on one or more portions of an enclosure of the deformable sensor.

BACKGROUND

Conventionally, a plurality of sensors such as cameras or tactile sensors may be positioned directly on portions of a robot to monitor the interaction of the robot with one or more external objects. However, depending on the size of the robot, the complexity of tasks that the robot may perform, and the various objects that may contact the robot, a vast number of tactile sensors may have to be positioned across various parts of the robot.

Accordingly, a need exists for a more efficient sensing component that is capable of detecting instances of contact with external objects over a large surface area of the robot body.

SUMMARY

In one embodiment, a deformable sensor is provided. The deformable sensor comprises a deformable member defining an enclosure that is configured to be filled with a medium, a mechanical component disposed within the enclosure, and an optical sensor coupled to the mechanical component positioned with the enclosure. In embodiments, the mechanical component is configured to rotate at least from a first position to a second position, and the optical sensor is configured to capture first portion data associated with a first portion of the deformable member at the first position and second portion data associated with a second portion of the deformable member at the second position.

In another embodiment, another deformable sensor is provided. The deformable sensor comprises a deformable member defining an enclosure that is configured to be filled with a medium, a mechanical component disposed within the enclosure, an optical sensor coupled to the mechanical component positioned within the enclosure. The mechanical component is configured to rotate at least from a first position to a second position and the optical sensor is configured to capture first portion data associated with a first portion of the deformable member at the first position and second portion data associated with a second portion of the deformable member at the second position. The deformable sensor also comprises a processor that is communicatively coupled with the deformable member and the optical sensor, wherein the processor is configured to determine, based on the first portion data and the second portion data, a first deformation level and a second deformation level associated the first portion and the second portion of the deformable member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Conventional techniques of monitoring a robot's interaction with various external objects have numerous deficiencies. In particular, depending on the size, shape, and contours of a robot, the number of objects with which the robot may interact, and the complexity of these interactions, a vast number of tactile sensors may have to be installed across various parts of the robot body. Such an installation may result in the burdening of computer processing and memory capabilities, restricting of design choices, and the creation of inefficiencies related to the data gathered by these sensors.

Embodiments of the present disclosure address and overcome these deficiencies. Specifically, the present disclosure is directed to a deformable sensor comprising a deformable member that defines an enclosure, a mechanical component disposed within the enclosure, and an optical sensor coupled to the mechanical component positioned within the enclosure. The optical sensor is configured to rotate over a range of 360 degrees, and as such, may be configured to scan vast portions of the surface area of a robot body such that deformations across one or more portions of the robot body may be effectively identified and analyzed.

Figure 1A:
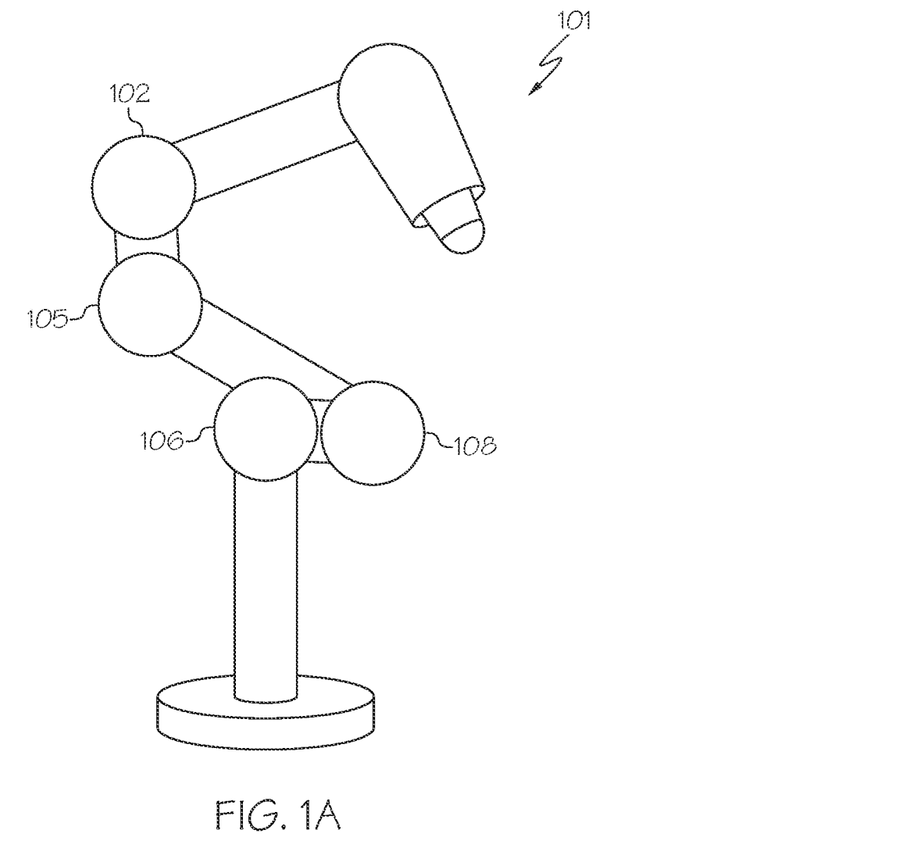
FIG. 1A schematically depicts an example robot upon which a plurality of example deformable sensors may be configured, according to one or more embodiments described and illustrated herein.

FIG. 1A schematically depicts an example robot 101 upon which a plurality of example deformable sensors 102, 105, 106, and 108 may be configured. As illustrated, the example deformable sensors 102, 105, 106, and 108 are positioned at various joints or hinges of a robotic arm of the example robot 101, which is fixedly positioned on a surface. It should be understood that embodiments are not limited to spherical deformable sensors, and that the deformable sensors may take on any shape. For example, the deformable sensors may be elongated and continuously extend along an arm of the robot.

The example robot 101 may include a computing device 104 (see FIG. 6) that is internal to the example robot 101 or may be a part of one or more devices that are external to the example robot 101. In embodiments, the computing device 104 that is external to the example robot 101 may communicate with another computing device, microprocessor, or a comparable component that is a part of the example robot 101. The communication may occur via a wired or wireless connection (e.g., Bluetooth, WiFi, and so forth). Operating instructions may be communicated between these devices. The example robot 101 may be battery operated, operated via connections to power sockets, and so forth. Additionally, data gathered by various sensors that are included within or operate in conjunction with the plurality of example deformable sensors 102, 105, 106, 108 may be communicated to one or more external devices or shared with various internal components of the example robot 101.

In embodiments, data gathered by various sensors of the example robot 101 may include data related to deformations or deformable levels that may occur on the outer surface of the example deformable sensors 102, 105, 106, 108. These deformations may be caused by one or more external objects contacting various portions of the outer surfaces of these sensors. The portions which are contacted by these objects may fall within a field of view of one or more optical sensors (e.g., time-of-flight sensors), which may be installed in the interior portions of the deformable sensors 102, 105, 106, 108. Upon contact, these sensors may gather data related to the shape, contours, and dimensions of these deformations. Such data may be analyzed by the computing device 104. The analysis may provide details regarding the shape, dimensions, and contours of the object that contacted the deformable sensors 102, 105, 106, 108, including the type of object that contacted these sensors.

Figure 1B:
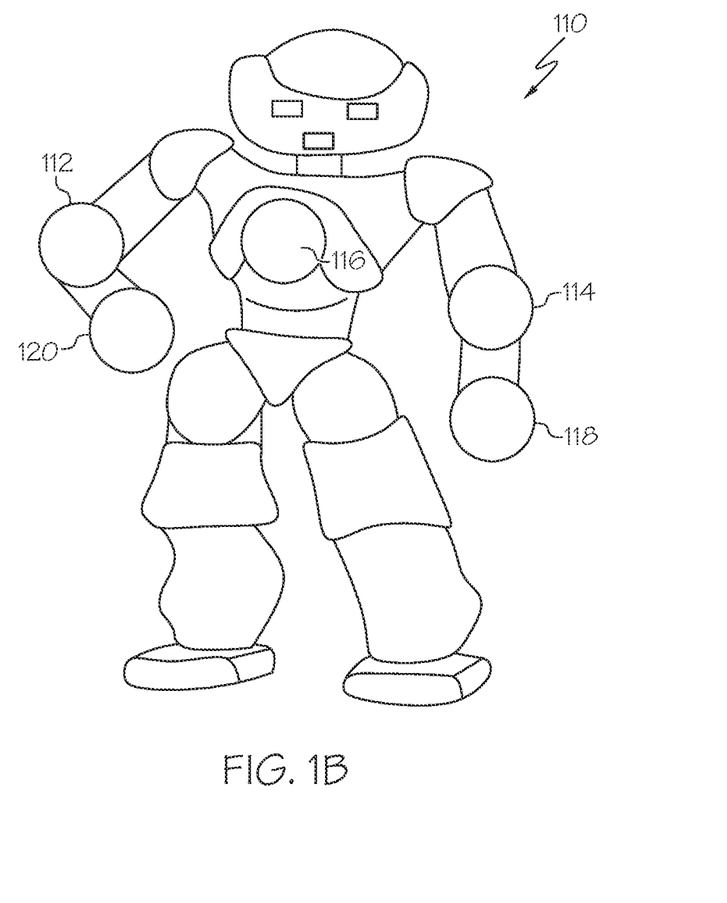
FIG. 1B schematically depicts another example robot upon which a plurality of example deformable sensors may be configured, according to one more embodiments described and illustrated herein.

FIG. 1B schematically depicts another example robot 110 upon which a plurality of example deformable sensors 112, 114, 116, 118, and 120 may be positioned, according to one or more embodiments described and illustrated herein. The example robot 111, resembling a human form, may include the example deformable sensors 112, 114, 116, 118, and 120 being positioned at the elbow joints, wrist areas, chest, and so forth. Additionally, as illustrated, the sensors are shown to have a substantially circular or spherical shape (e.g., as interpreted in 3D). However, the example deformable sensors 112, 114, 116, 118, and 120 may be configured on the example robot 110 such that these sensors closely conform to a particular part of the example robot 110.

For example, the example deformable sensor 112 may be designed such that it is mounted upon or encloses the entire length of the right arm of the example robot 110 such that the area from the shoulder to the wrist of the example robot 110 may be covered by the example deformable sensor 112. As described in greater detail in FIG. 2, the example deformable sensor 112 may include an enclosure that is filled with a medium, e.g., gas (e.g., air), gel (e.g., silicone), and the like. In embodiments, the time of flight sensors (with rotational capability) may be positioned at various locations on the arm of the example robot 110 on the interior of the enclosure of the example deformable sensor 112. In this way, as described above, these time of flight sensors may be configured to scan the entire surface area on the interior of the example deformable sensor 112, and gather data (e.g., in real time) relating to instances of deformation as a result of one or more objects contacting one or more exterior portions of the deformable sensor 112. The example deformable sensors 114, 116, 118, and 120 may operate in a similar manner.

Figure 2:
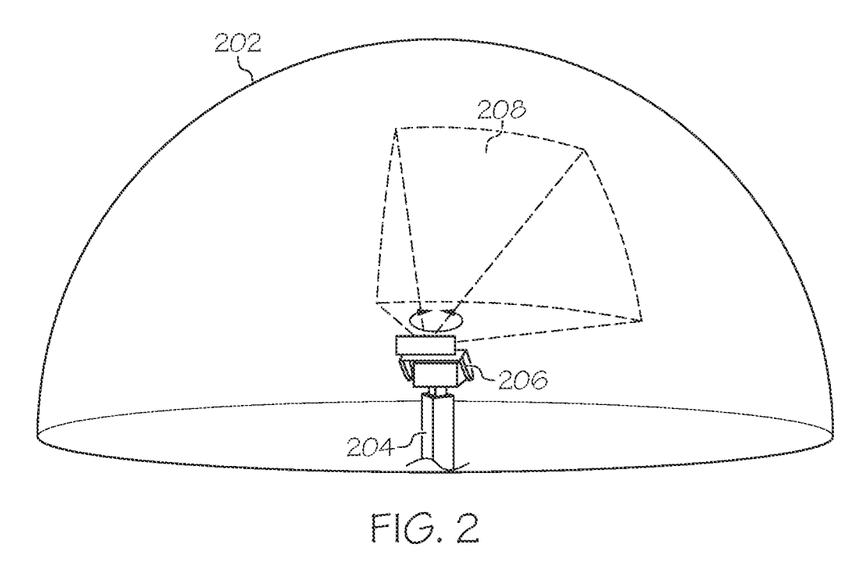
FIG. 2 schematically depicts various components of an example deformable sensor as described in the present disclosure, according to one more embodiments described and illustrated herein.

FIG. 2 schematically depicts various components of an example deformable sensor as described in the present disclosure according to one more embodiments described and illustrated herein. Specifically. FIG. 2 illustrates a partial portion of a deformable member defining an enclosure 202, a mechanical component 204 disposed within the enclosure, and a sensing component (e.g., a sensor) that is coupled to the mechanical component 204. It is noted that the enclosure may be filled with a medium such as gas or gel. In embodiments, a certain volume of gas or gel may be filled into or extracted from the enclosure 202, in order to provide the enclosure with a particular shape, e.g., dome shape, cylindrical shape, and so forth. The insertion or extraction of air or gas may be via apertures, valves, and so forth, that are disposed on the enclosure 202, or another portion of the example deformable sensor.

It is noted that the enclosure may be designed to suit the structure, contours, and dimensions of a particular portion of the robot upon which the deformable sensor is mounted or coupled. For example, the dimensions of the enclosure 202 of an example deformable sensor mounted on a limb of the robot may vary significantly from the dimensions of an enclosure of an example deformable sensor that is mounted or coupled to a back or stomach portion of the robot. Additionally, the example deformable member may be formed of latex, or other comparable materials that are non-porous and thin, with properties comparable to latex, and so forth.

The mechanical component 204 may be disposed within the enclosure 202 or may be positioned on an interior portion of a robot upon which the example deformable member is coupled. The mechanical component 204 may be formed of rubber or materials having properties comparable to rubber. The mechanical component 204 may be designed such that it is rigid enough to withstand the weight of a sensing component 206, while simultaneously being malleable or flexible enough to enable movement of the sensing component 206 around a 360 degree angle. It is noted that any rotation of the sensing component 206 would result in an exertion of some degree of pressure on the mechanical component 204.

In embodiments, the sensing component 206 may be an optical sensor such as a time-of-flight sensor that is capable of measuring deformation levels that may occur on one or more portions of the enclosure 202 of an example deformable member. The optical sensor may also be a pan-tilt time-of-flight sensor. The deformations may occur as a result of the enclosure 202 coming in contact with one or more moving or stationary objects located on the exterior of the robot on which the deformable sensor is mounted or coupled. In embodiments, the sensing component 206 may be a time-of-flight sensor that is capable of measuring depth. In operation, the time-of-flight sensor may emit an optical signal (e.g., an infrared signal) and utilize individual detectors to determine the length of time it may take for the emitted signal to contact a surface and return to the detector. The time-of-flight sensor may be designed for low spatial resolution (e.g., one "pixel" that detects a single point's displacement) or a high spatial resolution that is designed for dense tactile sensing. The sensing component may also include stereo cameras, laser range sensors, structured light sensors, three-dimensional scanners, single cameras, and so forth. The sensing component 206 may also be configured as a stereo-camera. Various other types of sensing components are also contemplated. Additionally, it is each of these types of sensing components 206 may operate in conjunction with each other and be positioned at various locations within the enclosure 202.

Returning to FIG. 2, in operation, the sensing component 206 may be mounted on a mechanical component and be configured to rotate around a vertical axis over a range of 360°. It is contemplated that one or more wheel based or sphere shaped components that facilitate rotation may be coupled to or mounted underneath the mechanical component 204. In embodiments, the computing device 104 that is communicatively coupled to the sensing component 206 may instruct the wheel based or sphere shaped components to rotate at a certain degree in order to control the movement of the sensing component 206. The degree to which the sensing component 206 is rotatable may vary. e.g., the rotation may occur in 5 degree increments, 10 degree increments, 15 degree increments, and so forth. At each interval of rotation, the sensing component 206 may have a particular field of view (e.g., example field of view 208) within a particular interior portion of the enclosure 202 may fall.

In this way, the rotational capability of the sensing component 206 enables the deformable sensor of the present disclosure to efficiently scan the entire surface area of the enclosure 202 and detect one or more instances of deformation at various portions in the interior of the enclosure 202. It is further noted that the data gathered by the sensing component 206 may communicate with various devices and components that part of the robot on which the deformable member is coupled and devices and components that are external to the robot. The communication may occur via a wired or wireless network (e.g., WiFi. Bluetooth, and so forth).

Figure 3A:
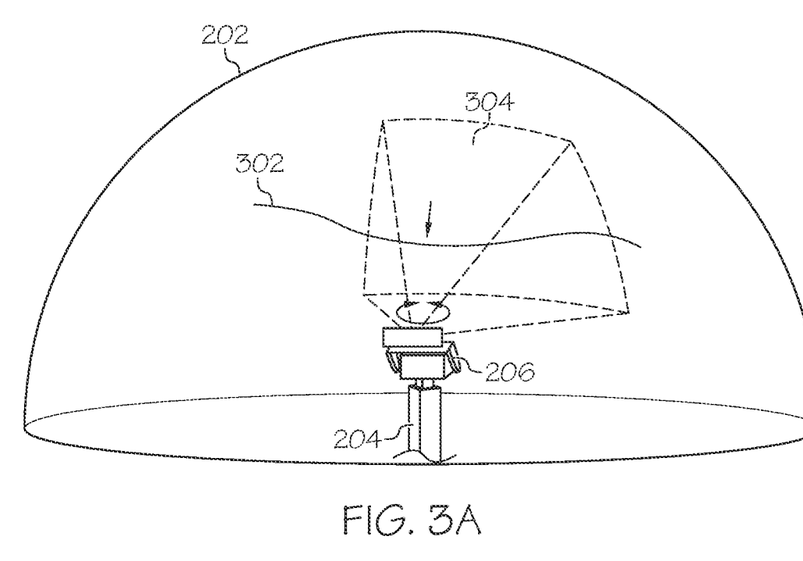
FIG. 3A schematically an example operation of the deformable sensor of the present disclosure in which a deformation level at a first portion on the interior of the enclosure is detected, according to one more embodiments described and illustrated herein.

FIG. 3A schematically depicts an example operation of the deformable sensor of the present disclosure in which a deformation level at a first portion on the interior of the enclosure 202 is detected. For example, the enclosure 202 illustrated in FIG. 3A may be the enclosure of the example deformable sensor 116 illustrated in FIG. 1B. As shown, the example deformable sensor 116 is positioned on the chest of the example robot 110. In embodiments, the example robot 110 may contact and carry an object that is external to the robot 110. e.g., a vase. A variety of other objects may also be carried. Thereafter, the example robot 110 may move the vase from an initial location towards the chest area of the example robot 110 and halt at a position such that the vase contacts and rests against the example deformable sensor 116. The deformation 302 illustrated in FIG. 3A may be representative of a deformation level that may be caused by the vase contacting a particular portion on the exterior of the example deformable sensor 116.

In embodiments, the computing device 104 (which may be internal to the example robot 110) may, in anticipation of the vase contacting the deformable sensor 116, position the sensing component 206 in a particular manner. Specifically, the sensing component 206 may be positioned such that the deformation 302 may be included within an example field of view 304 of the sensing component 206. Thereafter, the sensing component 206 may gather data (e.g., first portion data) related to the deformation 302, e.g., depth data, contours data, shape data, and so forth. However, as illustrated, the deformation 302 may extend across a surface area that exceeds the boundaries of the example field of view 304. As such, the computing device 104 may instruct the sensing component 206 to continue rotating in a different direction at a particular angle or degree. Such an instruction may be based on data gathered around the periphery of the sensing component 206 indicating that the boundaries of the deformation 302 has not be identified. It is noted that the computing device 104 may communicate instructions to the mechanical component 204, which may be the component that rotates a certain distance. In other embodiments, the computing device 104 may communicate the instruction directly to the sensing component 206.

Figure 3B:
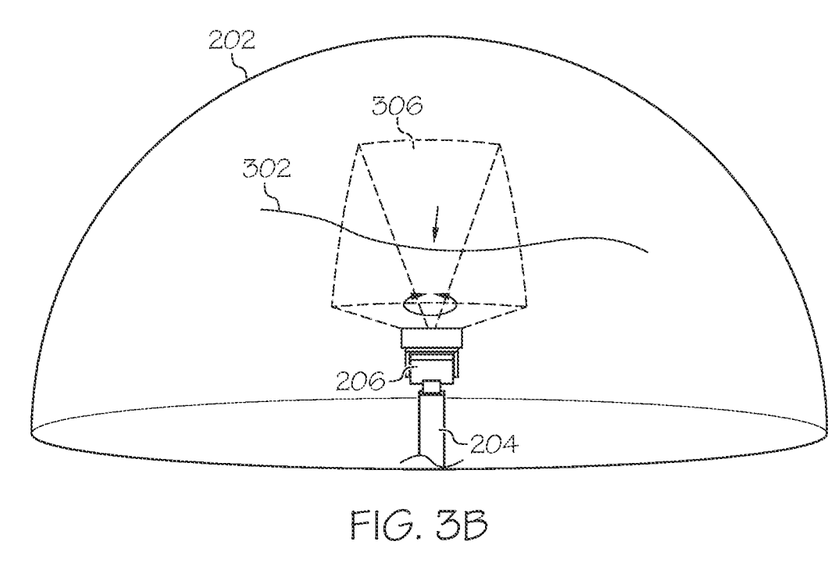
FIG. 3B schematically an example operation of the deformable sensor of the present disclosure in which another deformation level at a second portion on the interior of the enclosure is detected, according to one or more embodiments described and illustrated herein.

FIG. 3B schematically depicts an example operation of the deformable sensor of the present disclosure in which another deformation level at a second portion on the interior of the enclosure 202 is detected, according to one or more embodiments described and illustrated herein. As illustrated, the sensing component 206 may rotate to a new position corresponding to an example field of view 306. Within the example field of view 306 data (e.g., second portion data) related to another portion of the deformation 302 may be gathered. However, as illustrated in FIG. 3B, the deformation 302 may continue to extend across a surface area that exceeds the boundaries of the example field of view 306 as well. As such, the computing device 104 may further instruct the sensing component 206 to continue rotating in a different direction by at a particular angle or degree.

Figure 3C:
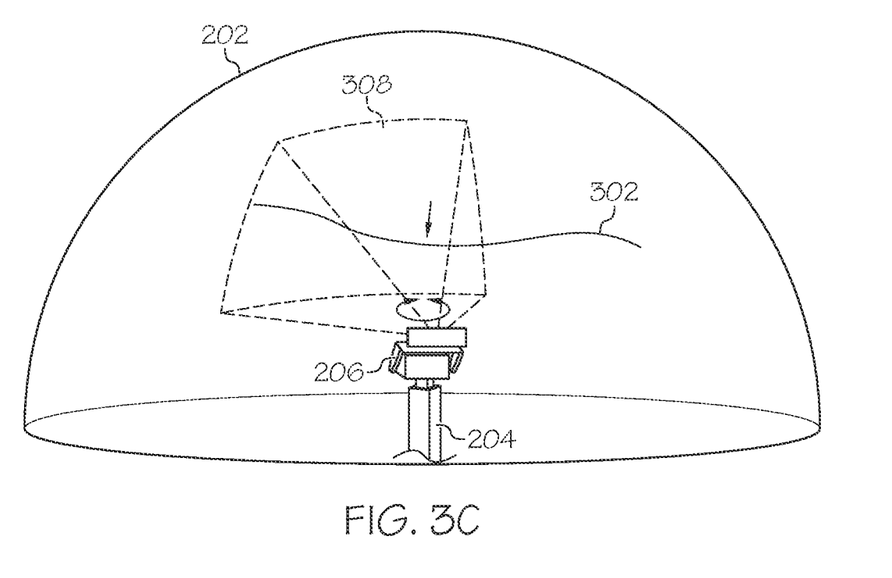
FIG. 3C schematically depicts an example operation of the deformable sensor of the present disclosure in which another deformation level at a third portion on the interior of the enclosure is detected, according to one or more embodiments described and illustrated herein.

FIG. 3C schematically depicts an example operation of the deformable sensor of the present disclosure in which another deformation level at a third portion on the interior of the enclosure 202 is detected, according to one or more embodiments described and illustrated herein. Specifically, as illustrated in FIG. 3C, the sensing component 206 may rotate to yet another new position corresponding to an example field of view 308. Within the example field of view 308, the sensing component 206 may capture data (e.g., third portion data) relating to the boundaries of the deformation 302. Additionally, the computing device 104 may combine the data (e.g., aggregate the first portion data, the second portion data, and the third portion data) gathered from the sensing component 206 from each of the example field of views 304, 306, 308, analyze the gathered data, and infer or predict the shape, dimensions, and contours of the object that is external to the example deformable sensor 116 positioned on the chest area of the example robot 110—the vase.

Figure 4A:
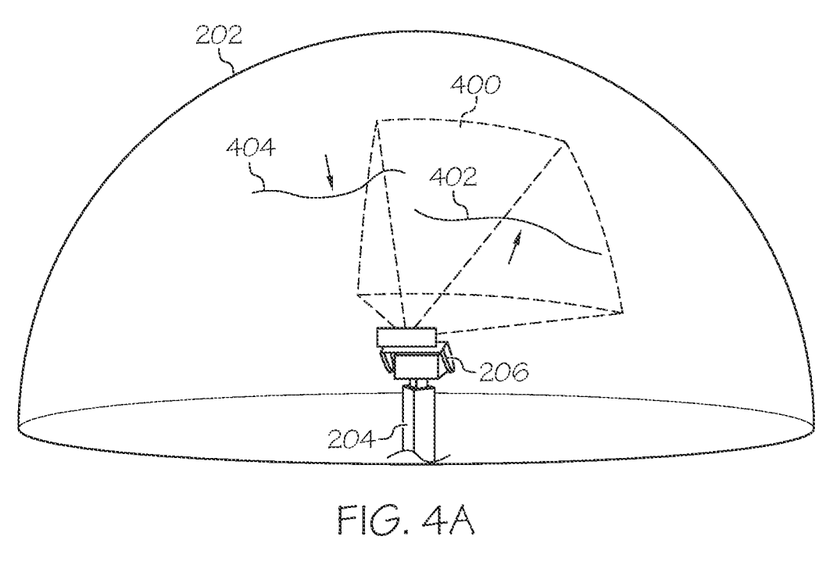
FIG. 4A schematically depicts an example operation of the deformable sensor of the present disclosure in which an expansion at a first area on the interior of the enclosure is detected, according to one or more embodiments described and illustrated herein.

FIG. 4A schematically depicts an example operation of the deformable sensor of the present disclosure in which an expansion level at a first area on the interior of the enclosure is detected, according to one or more embodiments described and illustrated herein. Specifically, as illustrated in FIG. 4A, the sensing component 206 may be positioned at a particular location and detect an outward movement or expansion 402 of a portion of the enclosure 202. For example, the enclosure 202 illustrated in FIG. 4A may be the enclosure of the example deformable sensor 116 illustrated in FIG. 1B, and the example robot 110 may contact and carry a vase from an initial position and halt at a position such that the vase contacts and rests against the example deformable sensor 116. The example deformation 404 illustrated in FIG. 4A may be representative of a deformation level that may be caused by the vase contacting a particular portion on the exterior of the example deformable sensor 116. As a result of such a deformation, a proportionate level of outward movement or expansion may occur across various portions of the enclosure 202, including the outward movement or expansion 402 of a portion that falls within an example field of view 400 of the sensing component 206.

The sensing component 206 may detect data related to the angle and dimensions of the expansion 402, data relating a degree of stretching or fluctuation in portions of the enclosure that fall within the example field of view 400, and data related to change in pressure within the enclosure 202 that is caused by the example deformation 404 and the expansion 402. The computing device 104 may analyze all of this data and predict a region of interest or a portion on the interior of the enclosure 202 that is likely to have experienced the example deformation 404. Based on this prediction, the computing device 104 may instruct the sensing component 206 to rotate in a particular direction by a particular angle or degree.

Figure 4B:
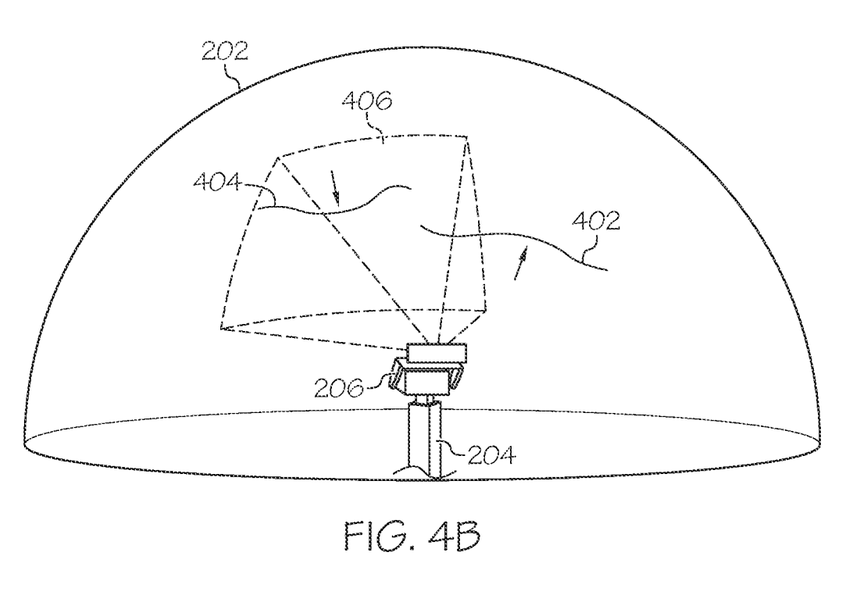
FIG. 4B schematically depicts another example operation of the deformable sensor of the present disclosure in which the sensing component rotates a certain distance based on a predicted region of interest in which the enclosure may experience an example deformation, according to one more embodiments described and illustrated herein.

FIG. 4B schematically depicts another example operation of the deformable sensor of the present disclosure in which the sensing component 206 rotates a certain distance based on a predicted region of interest in which the enclosure 202 may experience the example deformation 404. As illustrated, in FIG. 4B, the sensing component 206, based on receiving instructions from the computing device 104, rotates to a different position such that the example deformation 404 is included in the example field of view 406. In embodiments, the sensing component 206 may rotate to yet another position (e.g., a third position) based on detecting another expansion within another example field of view of the sensing component 206.

Figure 5A:
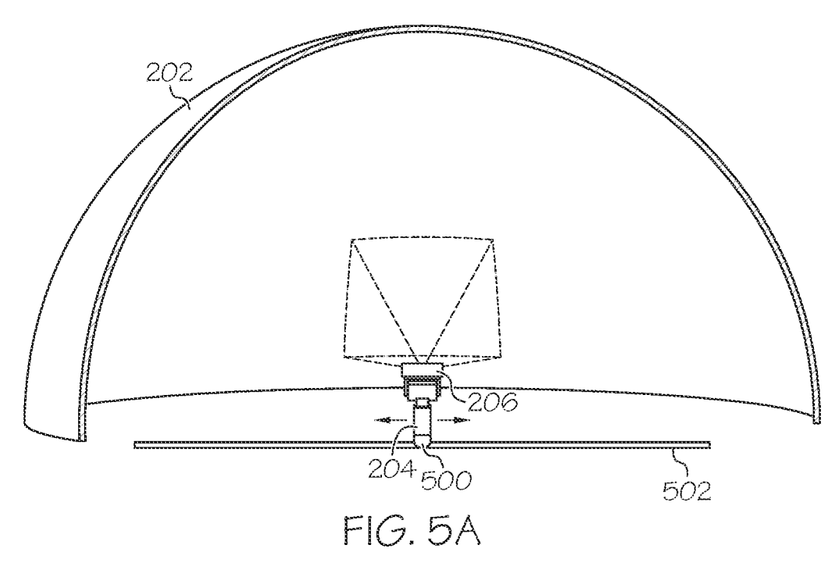
FIG. 5A schematically depicts an example installation of the example sensing component coupled to the mechanical component being mounted on a roller, which is configured to transport the sensing component along a rail, according to one or more embodiments described and illustrated herein.

FIG. 5A schematically depicts an example installation of the sensing component 206 coupled to the mechanical component 204 being mounted on a roller 500, which is configured to transport the sensing component 206 along a rail 502, according to one or more embodiments described and illustrated herein. In embodiments, the mechanical component 204, coupled to the sensing component 206, may be mounted on a roller 500 and be configured to, upon receiving one or more instructions from the computing device 104, travel along the rail 502 at various speeds in the lateral direction.

Figure 5B:
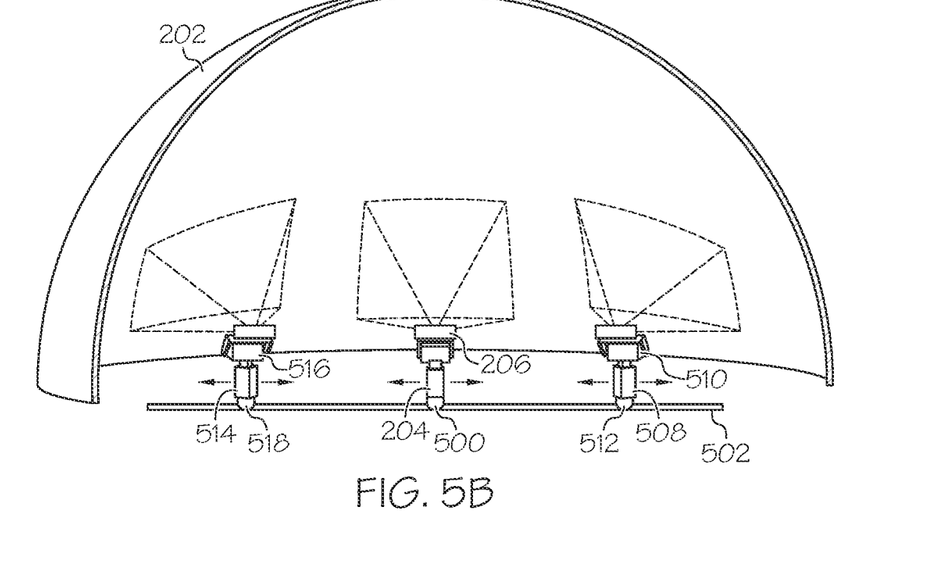
FIG. 5B schematically depicts an example implementation of a deformable sensor of the present disclosure in which a plurality of sensing components may be mounted on the rail and be positioned at certain intervals on the rail, according to one more embodiments described and illustrated herein.

FIG. 5B schematically depicts an example implementation of a deformable sensor of the present disclosure in which a plurality of sensing components may be mounted on the rail 502 and be positioned at certain intervals. Specifically, FIG. 5B illustrates example sensing components 510, 516 coupled to example mechanical components 508, 514 that are mounted on rollers 512, 518. Similar to the sensing component 206, the example sensing components 510, 516 may travel along the rail 502 at various speeds in the lateral direction.

Figure 6:
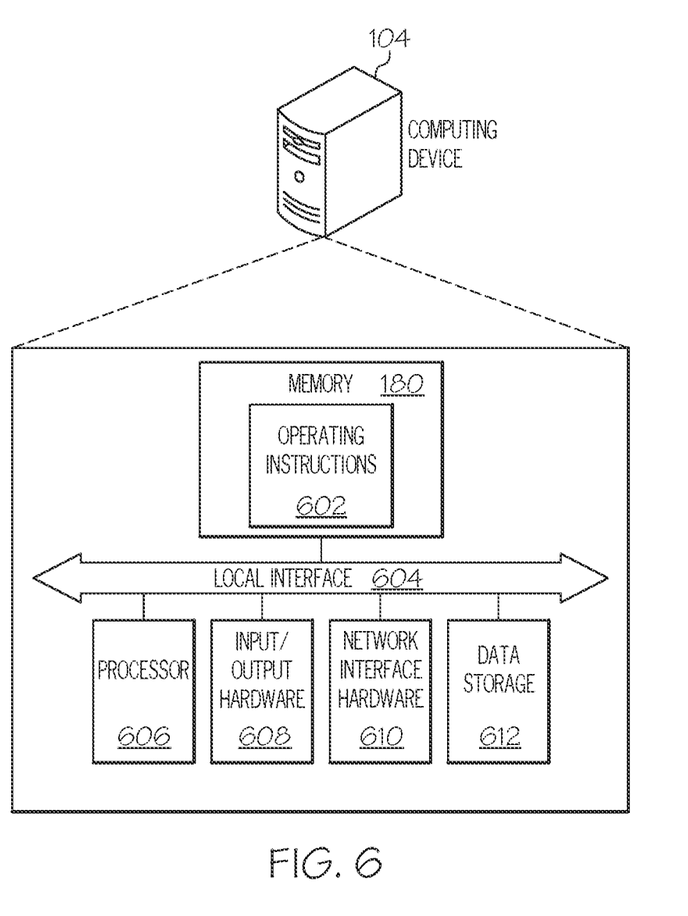
FIG. 6 depicts a non-limiting example of a computing device that may be communicatively coupled to or installed as part of the deformable sensor, according to one or more embodiments described illustrated herein.

FIG. 6 depicts a non-limiting example of a computing device that may be communicatively coupled to or installed as part of the deformable sensor of the present disclosure, according to one or more embodiments described and illustrated herein. As illustrated, the computing device 104 includes a processor 606, input/output hardware 608, a network interface hardware 610, a data storage component 612, and a memory component 180. The memory component 180 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the computing device 104 and/or a device that is external to the computing device 104.

The memory component 180 may store instructions 602, each of which may be embodied as a computer program, firmware, and so forth. A local interface 604 is also included in FIG. 6 and may be implemented as a bus or other communication interface to facilitate communication among the components of the computing device 104.

The processor 606 may include any processing component operable to receive and execute instructions 602 (such as from a data storage component 636 and/or the memory component 180). As described above, the input/output hardware 608 may include and/or be configured to interface with speakers, microphones, and/or other input/output components.

The operating instructions 602 may include an operating system and/or other software for managing components of the computing device 104. It should be understood that while the components in FIG. 6 are illustrated as residing within the computing device 104, this is merely an example. In some embodiments, one or more of the components may reside external to the computing device 104 or within other devices. It should also be understood that, while the computing device 104 is illustrated as a single device, this is also merely an example.

As an example, one or more of the functionalities and/or components described herein may be provided by the computing device 104. Depending on the particular embodiment, any of these devices may have similar components as those depicted in FIG. 6. To this end, any of these devices may include instructions for performing the functionality described herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising." or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It should be understood that certain embodiments described herein are directed to a deformable sensor comprising a deformable member defining an enclosure that is configured to be filled with a medium, a mechanical component disposed within the enclosure, and an optical sensor coupled to the mechanical component positioned with the enclosure. In embodiments, the mechanical component is configured to rotate at least from a first position to a second position, and the optical sensor is configured to capture first portion data associated with a first portion of the deformable member at the first position and second portion data associated with a second portion of the deformable member at the second position.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A deformable sensor comprising:
   a deformable member defining an enclosure that is configured to be filled with a medium;
   a mechanical component disposed within the enclosure;
   an optical sensor coupled to the mechanical component positioned within the enclosure, wherein:
   the mechanical component is configured to rotate at least from a first position to a second position; and
   the optical sensor is configured to capture first portion data associated with a first portion of the deformable member at the first position and second portion data associated with a second portion of the deformable member at the second position.

2. The deformable sensor of claim 1, a processor that is communicatively coupled with the deformable member and the optical sensor, wherein the processor is configured to determine, based on the first portion data and the second portion data, a first deformation level and a second deformation level associated the first portion and the second portion of the deformable member.

3. The deformable sensor of claim 2, wherein the processor determines the first deformation level and the second deformation level by analyzing pressure fluctuations associated with the deformable member.

4. The deformable sensor of claim 2, wherein the processor is configured to:
   detect a pressure change due to a deformation in a third portion of the deformable member, the third portion being outside of a field of view of the optical sensor;
   estimate a location of the third portion of the deformable member; and
   rotate the optical sensor from the second position to a third position, the third position is associated with a different field of view of the optical sensor, the different field of view including the third portion of the deformable member.

5. The deformable sensor of claim 2, wherein:
   the mechanical component is configured to rotate from the second position to a third position; and
   the optical sensor is configured to capture a third portion data associated with a third portion of the deformable member at the third position.

6. The deformable sensor of claim 2, wherein the processor is configured to:
   aggregate the first portion data and the second portion data; and
   determine, based on the aggregation, a shape of an object causing the first deformation level at the first portion and the second deformation level at the second portion.

7. The deformable sensor of claim 1, further comprising a rail structure upon which a time-of-flight sensor is disposed.

8. The deformable sensor of claim 7, wherein the time-of-flight sensor is configured to move in a lateral direction from a first location on the rail structure to a second location on the rail structure.

9. The deformable sensor of claim 7, further comprising an additional time-of-flight sensor that is disposed on the rail structure.

10. The deformable sensor of claim 9, wherein the additional time-of-flight sensor is configured to move in a lateral direction from a first location on the rail structure to a second location on the rail structure.

11. A deformable sensor comprising:
    a deformable member defining an enclosure that is configured to be filled with a medium;
    a mechanical component disposed within the enclosure;
    an optical sensor coupled to the mechanical component positioned within the enclosure, wherein:
    the mechanical component is configured to rotate at least from a first position to a second position, the optical sensor is configured to capture first portion data associated with a first portion of the deformable member at the first position and second portion data associated with a second portion of the deformable member at the second position; and a processor that is communicatively coupled with the deformable member and the optical sensor, wherein the processor is configured to determine, based on the first portion data and the second portion data, a first deformation level and a second deformation level associated the first portion and the second portion of the deformable member.

12. The deformable sensor of claim 11, wherein the processor determines the first deformation level and the second deformation level by analyzing pressure fluctuations associated with the deformable member.

13. The deformable sensor of claim 11, further comprising a rail structure upon which a time-of-flight sensor is disposed.

14. The deformable sensor of claim 13, wherein the time-of-flight sensor is configured to move in a lateral direction from a first location on the rail structure to a second location on the rail structure.

15. The deformable sensor of claim 13, further comprising an additional time-of-flight sensor that is disposed on the rail structure.

16. The deformable sensor of claim 15, wherein the additional time-of-flight sensor is configured to move in a lateral direction from a first location on the rail structure to a second location on the rail structure.

17. The deformable sensor of claim 11, wherein the processor is further configured to:

detect a pressure change due to a deformation in a third portion of the deformable member, the third portion being outside of a field of view of the optical sensor; and estimate a location of the third portion of the deformable member.

18. The deformable sensor of claim 17, wherein the processor is further configured to rotate the optical sensor from the second position to a third position, the third position is associated with a different field of view of the optical sensor, the different field of view including the third portion of the deformable member.

19. The deformable sensor of claim 11, wherein:

the mechanical component is configured to rotate from the second position to a third position; and the optical sensor is configured to capture a third portion data associated with a third portion of the deformable member at the third position.

20. The deformable sensor of claim 11, wherein the processor is configured to:

aggregate the first portion data and the second portion data; and determine, based on the aggregation, a shape of an object causing the first deformation level at the first portion and the second deformation level at the second portion.

* * * * *